June 6, 1939.  F. C. GIGNOUX  2,161,568

TOOL JOINT AND METHOD OF MAKING SAME

Filed Dec. 24, 1936

Frank C. Gignoux.
Inventor

By J. Vincent Martin
and
Ralph R. Browning.
Attorneys

Patented June 6, 1939

2,161,568

UNITED STATES PATENT OFFICE 2,161,568

TOOL JOINT AND METHOD OF MAKING SAME

Frank C. Gignoux, Houston, Tex., assignor to Reed Roller Bit Company, Houston, Tex., a corporation of Texas Application December 24, 1936, Serial No. 117,483

3 Claims. (Cl. 29—148.2)

This invention relates to pipe joints, and more particularly to that class of pipe joints utilized in joining together the sections of drill pipe in making up a drill stem used in drilling of wells and the like. This type of joint is usually referred to as a tool joint.

The connection between tool joints and the ends of drill pipe sections are customarily tapered V-threaded connections, the pin portion of the connection being on the drill pipe, and the box portion on the tool joint. Ordinarily, the box portion is extending a short distance beyond the ends of the threads therein so as to strengthen the same against the expansive stresses which are set up when the joint is tightly made up on the end of the pipe. This extension is customarily either loosely engaging or even spaced from the exterior surface of the pipe beyond the last thread. Thus, it will be seen that when the joint is made up tightly a compressive force will be exerted upon the pin portion of the joint tending to collapse the same, and this stress will be substantially at a maximum at the position of the last thread on the pin portion. The concentration of this stress at the last thread on the pin portion, at which point the pin portion is weakened by the notch which forms the last thread, has in fact been the cause of a great portion of the tool joint failures.

It is an object of this invention to provide a tool joint in which this concentration of stresses at the last thread on the pin portion of the joint will be avoided, and a joint provided which will not be subject to failure due to such concentration.

It is a more specific object of this invention to provide a structure of the type set forth in which there will be a greater surface of contact between the portions of the threaded joint, in which a better fluid seal will be maintained, in which a more efficient retention of lubricant will be effected, and in which the rigidity of the joint will be improved.

The manner of accomplishing these objects, as well as others, will appear from the following specification taken in connection with the accompanying drawing. It is to be understood, however, that the said drawing and description are by way of illustration only, and not by way of limitation, and that this invention is limited in scope only by the prior art and by the terms of the appended claims.

Figure 1:
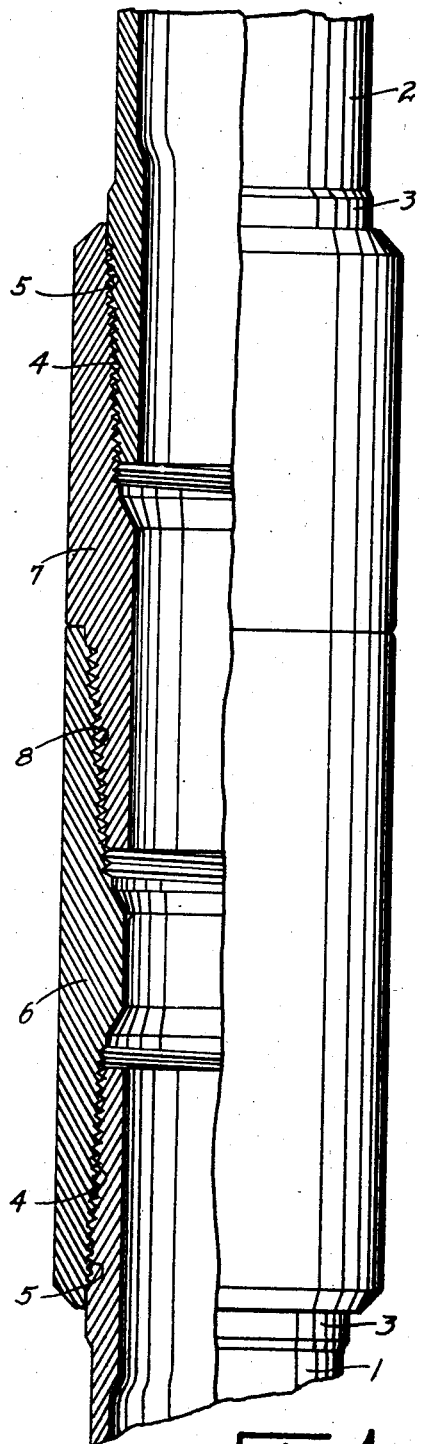
Fig. 1 is a view partly in elevation and partly in section, illustrating a tool joint construction in accordance with this invention.
Figure 2:
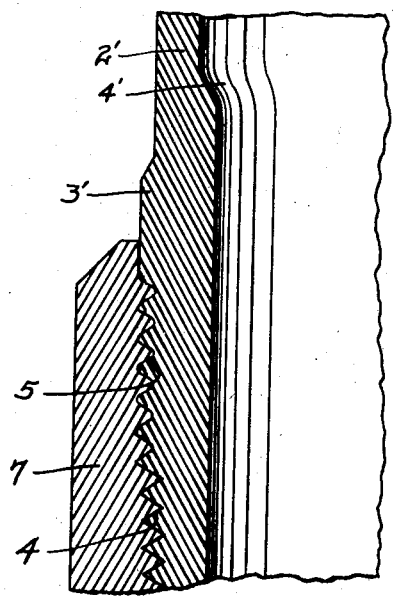
Fig. 2 is an enlarged cross section illustrating a portion of the structure shown in Fig. 1.

In the construction shown, the drill pipe sections 1 and 2 are each upset externally at 3, and provided with externally threaded tapered pin portions 4. At the base of each tapered portion there is also provided an extension of the threads on the tapered portion, this extension, however, taking the form of cylindrical threads 5. These threads 5 are of the same pitch as the threads 4, and while they are illustrated as being rounded threads instead of V-shaped threads, it will be understood that any desired type of thread may be employed.

For engagement with the end portions of the drill pipe sections 1 and 2 there are provided tool joint members 6 and 7 having the customary cooperating threads 8 for joining them to each other. These tool joint members 6 and 7 are each also internally threaded with threads adapted to cooperate with the tapered threads 4 on the drill pipe sections, and with cylindrical threads adapted to engage with the cylindrical threads 5 on the drill pipe sections. However, the pitch diameter of the threads in the cylindrical portion of the tool joint members 6 and 7 is initially slightly smaller than the pitch diameter of the threads 5 for a purpose which will presently appear.

Figure 3:
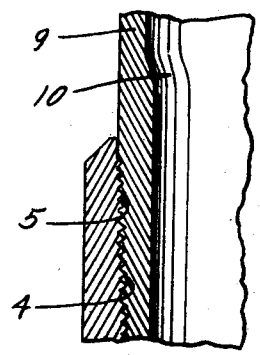
Fig. 3 is a view similar to Fig. 2, but illustrating a different modification of drill pipe.

In Fig. 3 the drill pipe 9 is internally upset at 10 instead of being externally upset as illustrated at 3 in Fig. 1.

As has been hereinbefore explained, the outstanding cause of failure of tool pipe at the termination of its threads is the concentration of compressive stresses at that point. These stresses are produced not only by the tension and torsion incident to drilling operations, but also by screwing the tapered threads of the pipe and joint together. The initial stresses created by screwing the pipe and joint together are generally known as "stresses due to make-up", and by means of this invention certain desired initial stresses can be effected to the end that the stresses of tension and torsion in drilling operations will not cause a failure in the joint.

The desired initial stresses are effected by providing the substantially cylindrical threaded portion on the drill pipe member, and the cylindrical internally threaded surface at the end of the tool joint member, the internal diameter of the latter being somewhat less than the external diameter of the former, as hereinbefore referred to.

In placing these tool joint members on the ends of the drill pipe sections, the end of the joint member is first heated so that the pitch diameter of the cylindrically threaded portion will be sufficiently great to receive the cylindrically threaded surface of the tube member. The joint member is then placed upon the tube member, but it is screwed thereon only with a hand tightness because the heating of the joint member distorts the threads of that member so that the pitch of its threads differs from the the pitch of the threads of the tube member, and if the threads are made up tight they will gall. It is also objectionable for other reasons to attempt to screw the hot joint member tightly on the cool member, for example, the lubricant on the threads cannot under such circumstances function properly. Needless to say, it is vitally important to protect the threads so that they will perform the desired function after the joint is made up. It will be seen that when the cylindrical threaded portion of the joint member cools, it will shrink upon the cylindrical portion of the tube member, and a stress will be created due to the tension of the joint member upon the exterior of the tube member. This is the initial stress above referred to.

The joint member after cooling is screwed tightly on the tube member by a machine. Since the threads 5 are cylindrical, this initial stress will not be increased, but the stresses due to make-up will be increased in the tapered threaded portion of the joint until the desired torsional resistance has been obtained.

When the joint member is screwed tightly on the tube member, the taper threads become tight, this being necessary to a good mechanical joint to resist the tension and torsion in drilling operations, for example, the stress in the threads may be as high as forty thousand pounds, but the stress at the end of the joint due to the shrinkage of the joint member on the tube member may be, say, twenty five thousand pounds. Therefore, the difference in stress between the threads and the adjacent connecting portions of the joint member and the tube member may be only fifteen thousand pounds. So there is no concentration of stresses at the termination of the taper threads on the tube member, and the value of the stresses at the ends of the cylindrical threads will be a constant and subject to fairly accurate control. This last mentioned concentration of stress which occurs at the end of the cylindrically threaded portion will not increase if the joint is made up a little more in use, and is calculated to be of such value that it will not cause any joint failure. It is also noted that the tube section is up-set either exteriorly or interiorly within the cylindrically threaded portion thereof for the purpose of taking up and withstanding these initial stresses.

In addition to the foregoing, it is noted that the provision of threads on the cylindrical portion of the joint adds strength and rigidity to the joint itself, while at the same time it provides a sort of labyrinth which will more readily retain the lubricant which is used in making up the joints, and which will provide a more perfect fluid tight seal, and a greater area of surface contact.

It will be seen from the foregoing that a method and apparatus has been provided for accomplishing all of the objects sought by this invention.

Having described my invention, I claim:

1. A tool joint comprising a part having an externally tapered threaded portion thereon and an externally cylindrical threaded portion adjacent said tapered threaded portion, and a second part having an internally tapered threaded portion and internally cylindrical threaded portion adjacent its tapered threaded portion, said externally cylindrical threaded portion being of a pitch diameter slightly greater than the pitch diameter of said internally cylindrical threaded portion, the tapered threaded and cylindrical threaded portions of said parts being complemental to and in engagement with each other, respectively, said cylindrical threaded portions being shrunk together.

2. A tool joint assembly comprising a tube member having an external tapered threaded portion and an external cylindrical threaded portion adjacent the inner end of said tapered threaded portion, and a joint member having an internal tapered threaded portion and an internal cylindrical threaded portion adjacent the outer end of said tapered threaded portion, said tapered threaded portions and said cylindrical threaded portions being interengageable, the outside diameter of said tube member cylindrical threaded portion being slightly greater than the internal diameter of said joint member cylindrical threaded portion, said joint member cylindrical threaded portion being movable on said tube member cylindrical threaded portion when said threads are screwed together, whereby concentration of stresses at the outer end of the tube member tapered threaded portion incident to the expansion of said joint member and the compression of said tube member when said members are screwed together is prevented, and said stresses are distributed over said tapered threaded and cylindrical threaded portions.

3. The method of assembling a tool joint assembly comprising a tube having an external tapered threaded portion and an external cylindrical threaded portion adjacent the inner end of said tapered threaded portion and a joint member having an internal tapered threaded portion and an internal cylindrical threaded portion adjacent the outer end of said tapered threaded portion, said tapered threaded portions and said cylindrical threaded portions being interengageable, the outside diameter of said tube member cylindrical threaded portion being slightly greater than the internal diameter of said joint member cylindrical threaded portion, which consists in heating the cylindrical threaded portion of said joint member, and screwing said joint member on said tube member to effect a relatively loose engagement of said cylindrical threaded portions and said tapered threaded portions, permitting said joint member cylindrical threaded portion to cool and shrink upon said tube member cylindrical threaded portion, and then screwing said joint member tightly on said tube member to effect a relatively tight engagement of said tapered threaded portions, and thereby preventing concentration of stresses at the outer end of said tube member tapered threaded portion incident to the expansion of said joint member and the compression of said tube member when said members are screwed tightly together, and causing said stresses to be distributed over said tapered threaded and cylindrical threaded portions.

FRANK C. GIGNOUX.